(12) United States Patent
Davis et al.

(10) Patent No.: US 9,853,985 B2
(45) Date of Patent: Dec. 26, 2017

(54) DEVICE TIME ACCUMULATION

(71) Applicant: International Business Machines Corporation, Armonk, NY (US)

(72) Inventors: Gregory A. Davis, New Brunswick (CA); Irakle Dzneladze, Kanata (CA); Jason D. Keirstead, Fredericton (CA); Helene Saint-Amour, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 14/881,732

(22) Filed: Oct. 13, 2015

(65) Prior Publication Data

US 2017/0104769 A1 Apr. 13, 2017

(51) Int. Cl.
*H04L 29/06* (2006.01)
*H04L 12/26* (2006.01)

(52) U.S. Cl.
CPC ......... *H04L 63/1408* (2013.01); *H04L 43/04* (2013.01); *H04L 43/08* (2013.01); *H04L 63/1425* (2013.01); *H04L 43/067* (2013.01)

(58) Field of Classification Search
CPC ........ G06F 15/173; G06F 13/00; G06F 17/30; G08B 23/00; H04J 3/06; H04L 7/00
USPC ....... 726/22, 25, 23; 709/238, 224; 719/318; 707/822, E17.005, E17.01; 370/351
See application file for complete search history.

(56) References Cited

U.S. PATENT DOCUMENTS

| | | | |
|---|---|---|---|
| 7,930,752 B2* | 4/2011 | Hertzog | G06F 21/552 709/224 |
| 8,438,276 B1 | 5/2013 | Haber et al. | |
| 8,578,048 B2* | 11/2013 | Kiefer | H04L 12/24 370/351 |
| 8,914,323 B1 | 12/2014 | Allen et al. | |
| 9,047,464 B2 | 6/2015 | Sambamurthy et al. | |
| 9,122,859 B1 | 9/2015 | Djabarov et al. | |
| 9,374,214 B2* | 6/2016 | Ito | H04L 7/0008 |
| 2003/0023874 A1 | 1/2003 | Prokupets et al. | |
| 2011/0191394 A1* | 8/2011 | Winteregg | G06F 17/30 707/822 |
| 2016/0127401 A1 | 5/2016 | Chauhan et al. | |

OTHER PUBLICATIONS

IBM, WebSphere Operational Decision Management, Solution Brief, printed Oct. 13, 2015.

* cited by examiner

*Primary Examiner* — Thanhnga B Truong
(74) *Attorney, Agent, or Firm* — Terrile, Cannatti, Chambers & Holland, LLP; Stephen A. Terrile

(57) ABSTRACT

A method, system and computer-usable medium are disclosed for performing a device time accumulation operation. With a device time accumulation operation systems within a security intelligence platform which accumulate events within the IT environment associate an event ingest time with the event. When the events are provided for analysis, the device time accumulation operation analyzes the ingest times as well as the emit time to take into account historical time data associated with the accumulated events.

12 Claims, 3 Drawing Sheets

US 9,853,985 B2

DEVICE TIME ACCUMULATION

BACKGROUND OF THE INVENTION

Field of the Invention

The present invention relates in general to the field of computers and similar technologies, and in particular to software utilized in this field. Still more particularly, it relates to a method, system and computer-usable medium for performing a device time accumulation operation.

Description of the Related Art

Organizations today are exposed to a greater volume and variety of attacks than in the past. Advanced attackers are clever and patient, leaving just a whisper of their presence. Accordingly, it is desirable to provide security functionality which helps to detect and defend against threats by applying sophisticated analytics to more types of data. It is also desirable to provide such security functionality which identifies high-priority incidents that might otherwise get lost in the noise of the overall operation of a large scale information processing environment.

It is known to provide security functionality to IT environments via security intelligence platforms which integrate security information and event management (SIEM), log management, anomaly detection, vulnerability management, risk management and incident forensics into a unified solution.

In many known IT environments such as large scale security intelligence platforms, events can be accumulated within a monitored system but not provided for analysis until some later time. When this occurs, the time information used for analyzing the events, including time series graphs, may be skewed.

SUMMARY OF THE INVENTION

A method, system and computer-usable medium are disclosed for performing a device time accumulation operation. With a device time accumulation operation systems within a security intelligence platform which accumulate events within the IT environment associate an event ingest time with the event. When the events are provided for analysis, the device time accumulation operation analyzes the ingest times as well as the emit time to take into account historical time data associated with the accumulated events.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
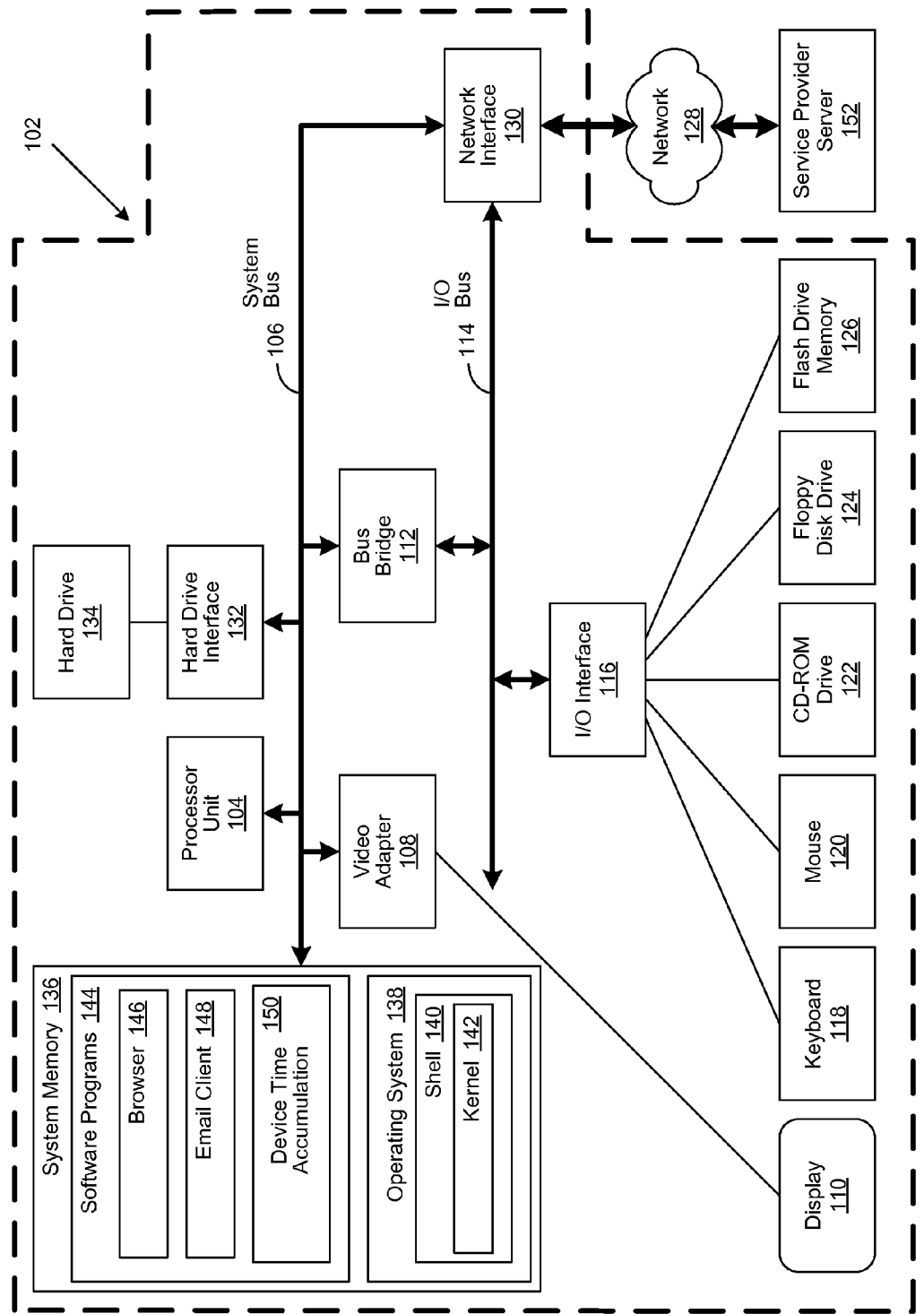
FIG. 1 depicts an exemplary client computer in which the present invention may be implemented.

A method, system and computer-usable medium are disclosed for performing a device time accumulation operation. With a device time accumulation operation systems within a security intelligence platform which accumulate events within the IT environment associate an event ingest time with the event. When the events are provided for analysis, the device time accumulation operation analyzes the ingest times as well as the emit time to take into account historical time data associated with the accumulated events.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include a device time accumulation system 150. In these and other embodiments, the device time accumulation system 150 includes code for implementing the processes described hereinbelow. In one embodiment, client computer 102 is able to download the device time accumulation system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
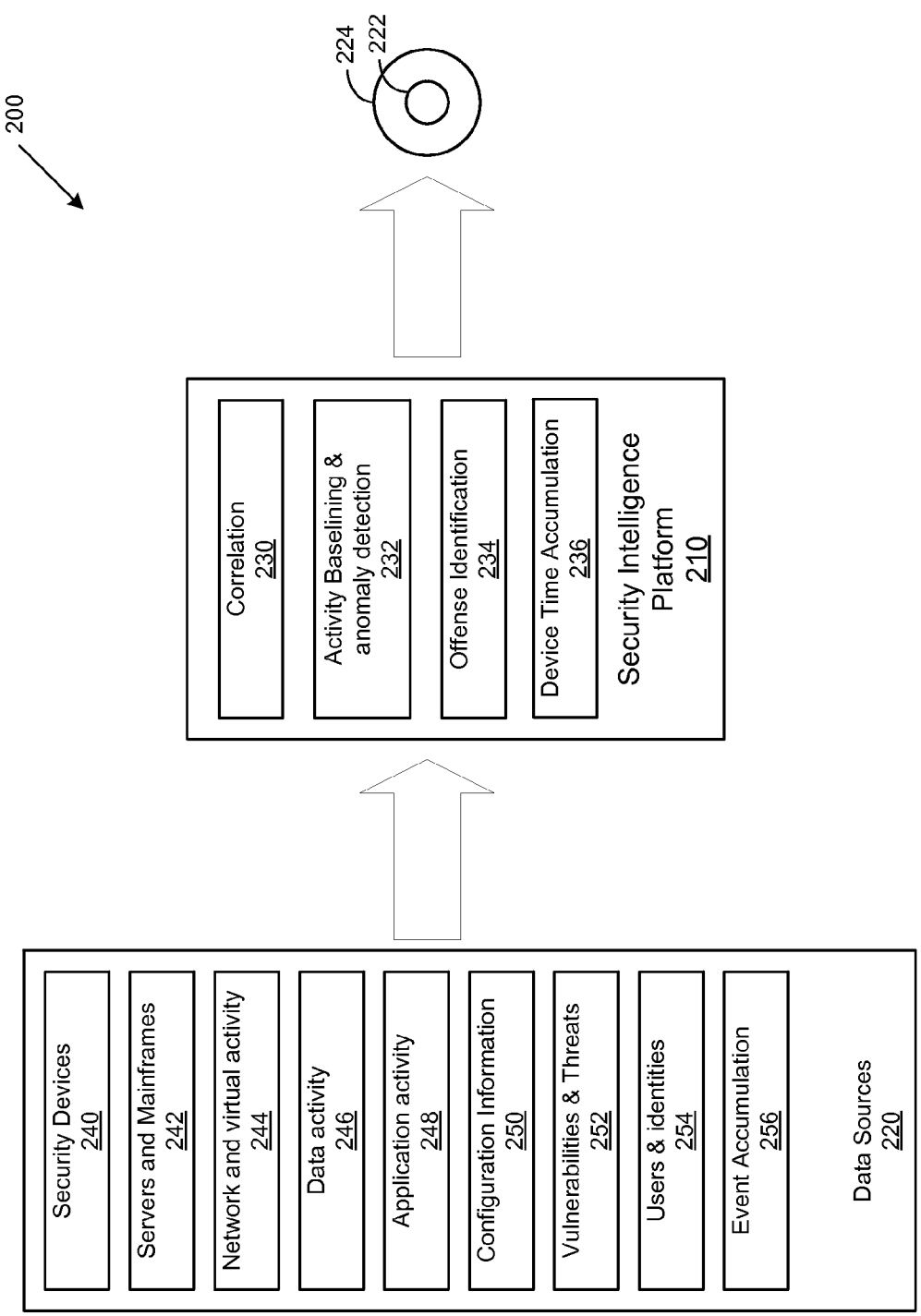
FIG. 2 is a simplified block diagram of a security intelligence platform.

FIG. 2 shows a simplified block diagram of a security intelligence environment 200 which includes a security intelligence platform 210 in accordance with various aspects of the invention. The security intelligence platform 210 integrates security information and event management (SIEM), log management, anomaly detection, vulnerability management, risk management and incident forensics into a unified solution. By using intelligence, integration and automation to provide 360-degree security insight, the security intelligence platform 210 delivers threat detection, ease of use and lower total cost of ownership. The security intelligence platform 210 uses intelligence, integration and automation to deliver security and compliance functionality.

The security intelligence platform 210 receives information from one or more of a plurality of data sources 220 and performs one or more of correlation operations, activity baselining and anomaly detection operations, offense identification operations and device time accumulation operations to provide an identification of a true offense 222 as well as identification of suspected intendents 224. In certain embodiments, the security intelligence platform 210 includes one or more of an integrated family of modules that can help detect threats that otherwise would be missed. For example, in certain embodiments, the family of modules can include a correlation module 230 for performing the correlation operations, an activity baselining and anomaly detection module 232 for performing the activity baselining and anomaly detection operations, an offense identification module 234 for performing the offense identification operation and a device time accumulation module 236 for performing a device time accumulation operation. In various embodiments, the correlation operation includes one or more of logs/events analysis, flow analysis, IP reputation analysis and geographic location analysis. In various embodiments, the activity baselining and anomaly detection operation includes one or more of user activity analysis, database activity analysis, application activity analysis and network activity analysis. In various embodiments, the offense identification operation includes one or more of credibility analysis, severity analysis and relevance analysis. The plurality of data sources 220 can include one or more of security devices 240, servers and mainframes 242, network and virtual activity data sources 244, data activity data sources 246, application activity data sources 248, configuration information data sources 250, vulnerabilities and threats information data sources 252 as well as users and identities data sources 254. The data sources 220 can also include an event accumulation module 256 into which events generated by any of the data sources are stored while awaiting forwarding to the security intelligence platform 210.

The security intelligence platform 210 helps detect and defend against threats by applying sophisticated analytics to the data received from the plurality of data sources. In doing so, the security intelligence platform 210 helps identify high-priority incidents that might otherwise get lost in the noise of the operation of a large scale information processing environment. The security intelligence platform 200 uses some or all of the integrated family of modules to solve a number of business issues including: consolidating data silos into one integrated solution; identifying insider theft and fraud; managing vulnerabilities, configurations, compliance and risks; conducting forensic investigations of incidents and offenses; and, addressing regulatory mandates.

In various embodiments, the security intelligence platform 210 provides a plurality of functions. For example, in certain embodiments, the security intelligence platforms consolidates data silos from a plurality of data sources. More specifically, while a wealth of information exists within organizations operating large scale information processing systems such as log, network flow and business process data, this information is often held in discrete data silos. The security intelligence platform 210 converges network, security and operations views into a unified and flexible solution. The security intelligence platform breaks down the walls between silos by correlating logs with network flows and a multitude of other data, presenting virtually all relevant information on a single screen. Such a correlation helps enable superior threat detection and a much richer view of enterprise activity.

Additionally, in various embodiments, the security intelligence platform performs an insider fraud detection operation. Some of the gravest threats to an organization can come from the inside the organization, yet organizations often lack the intelligence needed to detect malicious insiders or outside parties that have compromised user accounts. By combining user and application monitoring with application-layer network visibility, organizations can better detect meaningful deviations from normal activity, helping to stop an attack before it completes.

Additionally, in various embodiments, the security intelligence platform 210 predicts and remediates risk and vulnerabilities. Security, network and infrastructure teams strive to manage risk by identifying vulnerabilities and prioritizing remediation before a breach occurs. The security intelligence platform 210 integrates risk, configuration and vulnerability management with SIEM capabilities, including correlation and network flow analytics, to help provide better insight into critical vulnerabilities. As a result, organizations can remediate risks more effectively and efficiently.

Additionally, in various embodiments, the security intelligence platform 210 can conduct forensics analysis. In certain embodiments, the security intelligence platform 210 includes integrated incident forensics helps IT security teams reduce the time spent investigating security incidents, and eliminates the need for specialized training The security intelligence platform 210 expands security data searches to include full packet captures and digitally stored text, voice, and image documents. The security intelligence platform helps present clarity around what happened when, who was involved, and what data was accessed or transferred in a security incident. As a result, the security intelligence platform 210 helps remediate a network breach and can help prevent it from succeeding again.

Additionally, in various embodiments, the security intelligence platform 210 addresses regulatory compliance mandates. Many organizations wrestle with passing compliance audits while having to perform data collection, monitoring and reporting with increasingly limited resources. To automate and simplify compliance tasks, the security intelligence platform 210 provides collection, correlation and reporting on compliance-related activity, backed by numerous out-of-the-box report templates.

The security intelligence platform 210 leverages easier-to-use security analytics. More specifically, the security intelligence platform 210 provides a unified architecture for storing, correlating, querying and reporting on log, flow, vulnerability, and malevolent user and asset data. The security intelligence platform 210 combines sophisticated analytics with out-of-the-box rules, reports and dashboards. While the platform is powerful and scalable for large corporations and major government agencies, the platform is also intuitive and flexible enough for small and midsize organizations. Users benefit from potentially faster time to value, lower cost of ownership, greater agility, and enhanced protection against security and compliance risks.

The security intelligence platform 210 provides advanced intelligence. More specifically, by analyzing more types of data and using more analytics techniques, the platform can often detect threats that might be missed by other solutions and help provide advanced network visibility.

The security intelligence platform 210 also provides advanced integration. Because the security intelligence platform includes a common application platform, database and user interface, the platform delivers massive log management scale without compromising the real-time intelligence of SIEM and network behavior analytics. It provides a common solution for all searching, correlation, anomaly detection and reporting functions. A single, intuitive user interface provides seamless access to all log management, flow analysis, incident management, configuration management, risk and vulnerability management, incident forensics, dashboard and reporting functions.

The security intelligence platform 210 also provides advanced automation. More specifically, the security intelligence platform 201 is simple to deploy and manage, offering extensive out-of-the-box integration modules and security intelligence content. By automating many asset discovery, data normalization and tuning functions, while providing out-of-the-box rules and reports, the security intelligence platform 210 is designed to reduce complexity of the operation of the platform.

Figure 3:
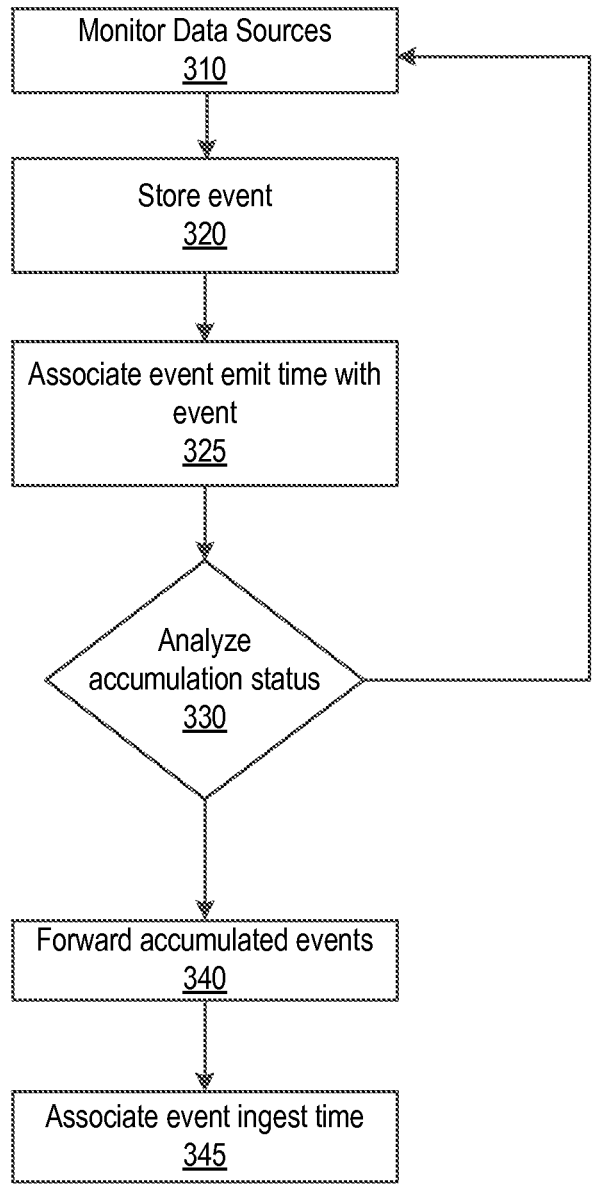
FIG. 3 is a generalized flowchart of the operation of a device time accumulation operation.

Referring to FIG. 3 a flow chart of a device time accumulation operation 300 is shown. More specifically, the device time accumulation operation begins at step 310 by monitoring the data sources 220 to determine whether an event has been generated by a system within the security intelligence environment 200. Any of the data sources 220 may generate an event. In various embodiments, the data sources 220 may include one or more of a firewall, a network switch, a user end point (e.g., some form of information processing system such as a portable information processing system or a desktop information processing system), a wireless access point and a physical security device (e.g., a badge reader). Next, at step 320 when an event is generated, the event is stored within the event accumulation module 256. When the event is stored within the event accumulation module 256, an event emit time is associated with the event and is stored within the event accumulation module 256 with the event at step 325. For the purposes of this disclosure, an event emit time corresponds to the time at which an associated event is generated by a data source.

Next, at step 330, the device time accumulation operation 300 analyzes an accumulation status to determine whether to forward any accumulated events on to the security intelligence platform 210. If the device time accumulation operation 300 determines based upon the accumulation status to not forward the accumulated events, then the operation returns to step 310 to await a next event. If the device time accumulation operation 300 determines based upon the accumulation status to forward the accumulated events, then the operation 300 forwards the accumulated events to the security intelligence platform 210 at step 340. When the events are forwarded to the security intelligence platform 210, an event ingest time is associated with each forwarded event at step 345. For the purposes of this disclosure, an ingest emit time corresponds to the time at which an associated event is forwarded to the security intelligence platform 210.

The device time accumulation module 236 then makes use of both the event ingest time as well as the event emit time to analyze the events to take into account historical data. More specifically, the device time accumulation module 236 can use time series graphs for analyzing the events taking into account the event ingest time associated with the event as well as the event emit time. In various embodiments, the event ingest times and the event emit times are used to create accumulations of the data. The accumulations that are created are used for analytics or to populate time-series graphs for graphical representation of the data. In various embodiments, the accumulations may be ordered by device time of by security analysis platform time. This information becomes especially important when the analysis takes into account accumulation of multiple events across a given amount of time. In this situation, the emit times can skew the time series graph analysis whereas including ingest times in the time series graph does not.

Although the present invention has been described in detail, it should be understood that various changes, substitutions and alterations can be made hereto without departing from the spirit and scope of the invention as defined by the appended claims.

What is claimed is:

1. A system comprising:
a processor;
a data bus coupled to the processor; and
a computer-usable medium embodying computer program code, the computer-usable medium being coupled to the data bus, the computer program code executing within a security intelligence environment, the security intelligence environment comprising a plurality of data sources and a security intelligence platform, the security intelligence platform comprising a device time accumulation module executing on the processor of the system, the computer program code used for processing device time information and comprising instructions executable by the processor and configured for:
monitoring a security intelligence platform for a plurality of events, the plurality of events being generated by at least one data source of the security intelligence environment;
storing the plurality of events for later processing, the storing comprising associating an event emit time with each of the plurality of events, the event emit time representing a time when the event was generated;
forwarding the plurality of events to a security platform, the forwarding comprising an event ingest time with each of the plurality of events, the event ingest time representing a time when the event was forwarded to the security platform;
processing the plurality of events, the processing considering the event ingest time and the event emit time of each of the plurality of events to take into account historical time data associated with the plurality of events; and wherein
the storing, forwarding and processing are performed by the device time accumulation module; and,
the processing further comprises using a set of criteria to group events together based upon similar properties and recording events over time.

2. The system of claim 1, wherein:
the at least one data source comprises at least one of a security device and an information processing system.

3. The system of claim 1, wherein:
the plurality of events comprises at least one of information relating to network and virtual activity, information relating to data activity, information relating to application activity, configuration information, vulnerability and threat information and information relating to users and identities.

4. The system of claim 1, wherein:
the plurality of events are stored within an event accumulation module.

5. A system comprising:
a processor;
a data bus coupled to the processor; and
a computer-usable medium embodying computer program code, the computer-usable medium being coupled to the data bus, the computer program code executing within a security intelligence environment, the security intelligence environment comprising a plurality of data sources and a security intelligence platform, the security intelligence platform comprising a device time accumulation module executing on the processor of the system, the computer program code used for processing device time information and comprising instructions executable by the processor and configured for:
monitoring a security intelligence platform for a plurality of events, the plurality of events being generated by at least one data source of the security intelligence environment;
storing the plurality of events for later processing, the storing comprising associating an event emit time with each of the plurality of events, the event emit time representing a time when the event was generated;
forwarding the plurality of events to a security platform, the forwarding comprising an event ingest time with each of the plurality of events, the event ingest time representing a time when the event was forwarded to the security platform;
processing the plurality of events, the processing considering the event ingest time and the event emit time of each of the plurality of events to take into account historical time data associated with the plurality of events; and wherein
the storing, forwarding and processing are performed by the device time accumulation module; and,
the processing further comprises creating accumulations of the plurality of events, the accumulations being used for analytics or to populate time-series graphs for graphical representation of the data.

6. A non-transitory, computer-readable storage medium embodying computer program code for execution within a security intelligence environment, the security intelligence environment comprising a plurality of data sources and a security intelligence platform, the security intelligence platform comprising a device time accumulation module executing on a processor of a system, the computer program code comprising computer executable instructions configured for:
monitoring a security intelligence platform for a plurality of events, the plurality of events being generated by at least one data source of the security intelligence environment;
storing the plurality of events for later processing, the storing comprising associating an event emit time with each of the plurality of events, the event emit time representing a time when the event was generated;
forwarding the plurality of events to a security platform, the forwarding comprising an event ingest time with each of the plurality of events, the event ingest time representing a time when the event was forwarded to the security platform;
processing the plurality of events, the processing considering the event ingest time and the event emit time of each of the plurality of events to take into account historical time data associated with the plurality of events; and wherein
the storing, forwarding and processing are performed by the device time accumulation module; and,
the processing further comprises using a set of criteria to group events together based upon similar properties and recording events over time.

7. The non-transitory, computer-readable storage medium of claim 6, wherein:
the at least one data source comprises at least one of a security device and an information processing system.

8. The non-transitory, computer-readable storage medium of claim 6, wherein:
the plurality of events comprises at least one of information relating to network and virtual activity, information relating to data activity, information relating to application activity, configuration information, vulnerability and threat information and information relating to users and identities.

9. The non-transitory, computer-readable storage medium of claim 6, wherein:
the plurality of events are stored within an event accumulation module.

10. The non-transitory, computer-readable storage medium of claim 6, wherein the computer executable instructions are deployable to a client system from a server system at a remote location.

11. A non-transitory, computer-readable storage medium embodying computer program code for execution within a security intelligence environment, the security intelligence environment comprising a plurality of data sources and a security intelligence platform, the security intelligence platform comprising a device time accumulation module executing on a processor of a system, the computer program code comprising computer executable instructions configured for:
monitoring a security intelligence platform for a plurality of events, the plurality of events being generated by at least one data source of the security intelligence environment;
storing the plurality of events for later processing, the storing comprising associating an event emit time with each of the plurality of events, the event emit time representing a time when the event was generated;
forwarding the plurality of events to a security platform, the forwarding comprising an event ingest time with each of the plurality of events, the event ingest time representing a time when the event was forwarded to the security platform;
processing the plurality of events, the processing considering the event ingest time and the event emit time of each of the plurality of events to take into account historical time data associated with the plurality of events; and wherein
the storing, forwarding and processing are performed by the device time accumulation module; and,
the processing further comprises creating accumulations of the plurality of events, the accumulations being used for analytics or to populate time-series graphs for graphical representation of the data.

12. A non-transitory, computer-readable storage medium embodying computer program code for execution within a security intelligence environment, the security intelligence environment comprising a plurality of data sources and a security intelligence platform, the security intelligence platform comprising a device time accumulation module executing on a processor of a system, the computer program code comprising computer executable instructions configured for:
monitoring a security intelligence platform for a plurality of events, the plurality of events being generated by at least one data source of the security intelligence environment;
storing the plurality of events for later processing, the storing comprising associating an event emit time with each of the plurality of events, the event emit time representing a time when the event was generated;
forwarding the plurality of events to a security platform, the forwarding comprising an event ingest time with each of the plurality of events, the event ingest time representing a time when the event was forwarded to the security platform;
processing the plurality of events, the processing considering the event ingest time and the event emit time of each of the plurality of events to take into account historical time data associated with the plurality of events; and wherein
the storing, forwarding and processing are performed by the device time accumulation module; and,
the computer executable instructions are provided by a service provider to a user on an on-demand basis.

* * * * *